United States Patent
Chukrallah et al.

(10) Patent No.: US 11,199,325 B2
(45) Date of Patent: Dec. 14, 2021

(54) METHOD FOR REDUCING FUEL NOZZLE COKING IN A GAS TURBINE ENGINE

(71) Applicant: United Technologies Corporation, Farmington, CT (US)

(72) Inventors: Sami Chukrallah, West Palm Beach, FL (US); Andre M. Ajami, Palm City, FL (US); Robert B. Davis, Jupiter, FL (US)

(73) Assignee: Raytheon Technologies Corporation, Farmington, CT (US)

(*) Notice: Subject to any disclaimer, the term of this patent is extended or adjusted under 35 U.S.C. 154(b) by 295 days.

(21) Appl. No.: 16/390,315

(22) Filed: Apr. 22, 2019

(65) Prior Publication Data

US 2020/0333002 A1 Oct. 22, 2020

(51) Int. Cl.
| | |
|---|---|
| F23N 1/00 | (2006.01) |
| F02C 3/32 | (2006.01) |
| F23N 5/20 | (2006.01) |
| F23R 3/28 | (2006.01) |
| F02C 7/264 | (2006.01) |
| B05B 1/08 | (2006.01) |

(52) U.S. Cl.
CPC ............. *F23N 1/002* (2013.01); *F02C 3/32* (2013.01); *F02C 7/264* (2013.01); *F23N 5/203* (2013.01); *F23R 3/28* (2013.01); *B05B 1/083* (2013.01); *F05D 2270/31* (2013.01); *F23D 2900/00016* (2013.01); *F23N 2225/08* (2020.01); *F23N 2235/28* (2020.01); *F23N 2241/20* (2020.01); *F23R 2900/00004* (2013.01)

(58) Field of Classification Search
CPC . F23D 2900/00004; F23D 2900/00016; F23C 2205/10
See application file for complete search history.

(56) References Cited

U.S. PATENT DOCUMENTS

| | | | |
|---|---|---|---|
| 5,735,117 A | 4/1998 | Toelle | |
| 9,151,227 B2 * | 10/2015 | Lockyer | .................. F02C 7/222 |
| 9,863,322 B2 | 1/2018 | Williams et al. | |
| 2009/0108095 A1 | 4/2009 | Ruiz | |
| 2010/0115955 A1 | 5/2010 | Goeke et al. | |
| 2010/0241339 A1 * | 9/2010 | Proietty | ................ F02D 41/401 |
| | | | 701/109 |

OTHER PUBLICATIONS

European Search Report for Application No. 20169276.1 dated Sep. 14, 2020.

* cited by examiner

*Primary Examiner* — Ehud Gartenberg
*Assistant Examiner* — Jacek Lisowski
(74) *Attorney, Agent, or Firm* — Carlson, Gaskey & Olds, P.C.

(57) ABSTRACT

A gas turbine engine includes a compressor section, a combustor fluidly connected to the compressor section via a primary flowpath, a turbine section fluidly connected to the combustor via the primary flowpath, and a plurality of fuel injectors disposed within the combustor. The plurality of fuel injectors including at least one start fuel injector. Also included is a controller having a memory and processor. The memory stores instructions configured to cause the at least one start fuel injector to pulse fuel through the start injector nozzle, thereby preventing stagnant fuel in the start injector nozzle from exceed a coking temperature threshold.

19 Claims, 2 Drawing Sheets

METHOD FOR REDUCING FUEL NOZZLE COKING IN A GAS TURBINE ENGINE

TECHNICAL FIELD

The present disclosure relates generally to fuel injection operations in a gas turbine engine, and more specifically to a method for reducing coking within a fuel nozzle.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

In order to initiate combustion operations within the gas turbine engine during engine startup, specialized start injectors are included within a combustor and inject fuel into the combustor to allow for the initiation of the engine and for the engine to get up to speed. Once the engine has transitioned to full speed operations, fuel injection from the start injectors is no longer required. Due to their proximity to the combustion, the start injectors are exposed to high temperatures that are in excess of a coking temperature of stagnant fuel in the start injector. When the fuel is raised to, or maintained above, the coking temperature for the fuel, coke deposits form and can block the injector nozzle. The blockage results in inefficient operation or in an inoperability of the start injector nozzle. This in turn can require expensive and time consuming repairs to replace the nozzle.

SUMMARY OF THE INVENTION

An exemplary method for operating a fuel injector includes pulsing fuel through a start injector nozzle and thereby preventing stagnant fuel in the start injector nozzle from exceed a coking temperature threshold.

In another example of the above described method for operating a fuel injector pulsing fuel through the start injector nozzle comprises forcing stagnant fuel out of the start injector nozzle by providing fresh fuel to the start injector nozzle for a pulse width.

In another example of any of the above described methods for operating a fuel injector the pulse width is a duration of time such that the fresh fuel has supplanted at least 100% of a volume of the stagnant fuel.

In another example of any of the above described methods for operating a fuel injector the pulse width is stored in a controller memory and is at least partially dependent on a fuel type.

Another example of any of the above described methods for operating a fuel injector further includes allowing fuel in the start injector nozzle to be stagnant for a period of time and reiterating pulsing the fuel through the start injector nozzle after the period has elapsed.

In another example of any of the above described methods for operating a fuel injector the period of time is stored in a controller memory and is dependent on a fuel type and an engine operating condition.

In another example of any of the above described methods for operating a fuel injector the engine operating condition is an engine load.

In another example of any of the above described methods for operating a fuel injector the period of time is determine to have elapsed when a temperature of stagnant fuel exceeds a pulse temperature threshold.

In another example of any of the above described methods for operating a fuel injector the pulse temperature threshold is at most 70% of a coking temperature threshold of the fuel.

In another example of any of the above described methods for operating a fuel injector the temperature of the nozzle wall is determined via direct measurement.

In another example of any of the above described methods for operating a fuel injector the temperature of the nozzle wall is derived via one or more indirect measurements.

In one exemplary embodiment a gas turbine engine includes a compressor section, a combustor fluidly connected to the compressor section via a primary flowpath, a turbine section fluidly connected to the combustor via the primary flowpath, a plurality of fuel injectors disposed within the combustor, the plurality of fuel injectors including at least one start fuel injector, and a controller including a memory and processor, the memory storing instructions configured to cause the at least one start fuel injector to pulse fuel through the start injector nozzle, thereby preventing stagnant fuel in the start injector nozzle from exceed a coking temperature threshold.

In another example of the above described gas turbine engine the at least one start fuel injector includes at least one temperature sensor.

In another example of any of the above described gas turbine engines the controller includes instructions configured to derive a temperature of stagnant fuel within the at least one start injector based on engine operating conditions.

In another example of any of the above described gas turbine engines a pulse width of pulsing the fuel through the start injector nozzle is a duration of time such that fresh fuel has supplanted approximately 100% of the stagnant fuel.

In another example of any of the above described gas turbine engines the controller further includes instructions configured to reiterate pulsing fuel through the start injector nozzle according to a period of time dependent on a fuel type and an engine operating condition.

In another example of any of the above described gas turbine engines the controller further includes instructions configured to reiterate pulsing fuel through the start injector nozzle in response to fuel within the start injector nozzle in response to a temperature of stagnant fuel in the start injector nozzle exceeding predefined temperature threshold.

In another example of any of the above described gas turbine engines the predefined temperature threshold is at most 70 percent of a coking temperature threshold of the stagnant fuel.

An exemplary method for improving a gas turbine engine includes updating an engine controller configured to control start injector nozzles in a combustor by providing the controller with instructions configured to cause the controller to cause at least one start fuel injector to pulse fuel through the start injector nozzle, thereby preventing stagnant fuel in the start injector nozzle from exceed a coking temperature threshold.

These and other features of the present invention can be best understood from the following specification and drawings, the following of which is a brief description.

DETAILED DESCRIPTION

Figure 1:
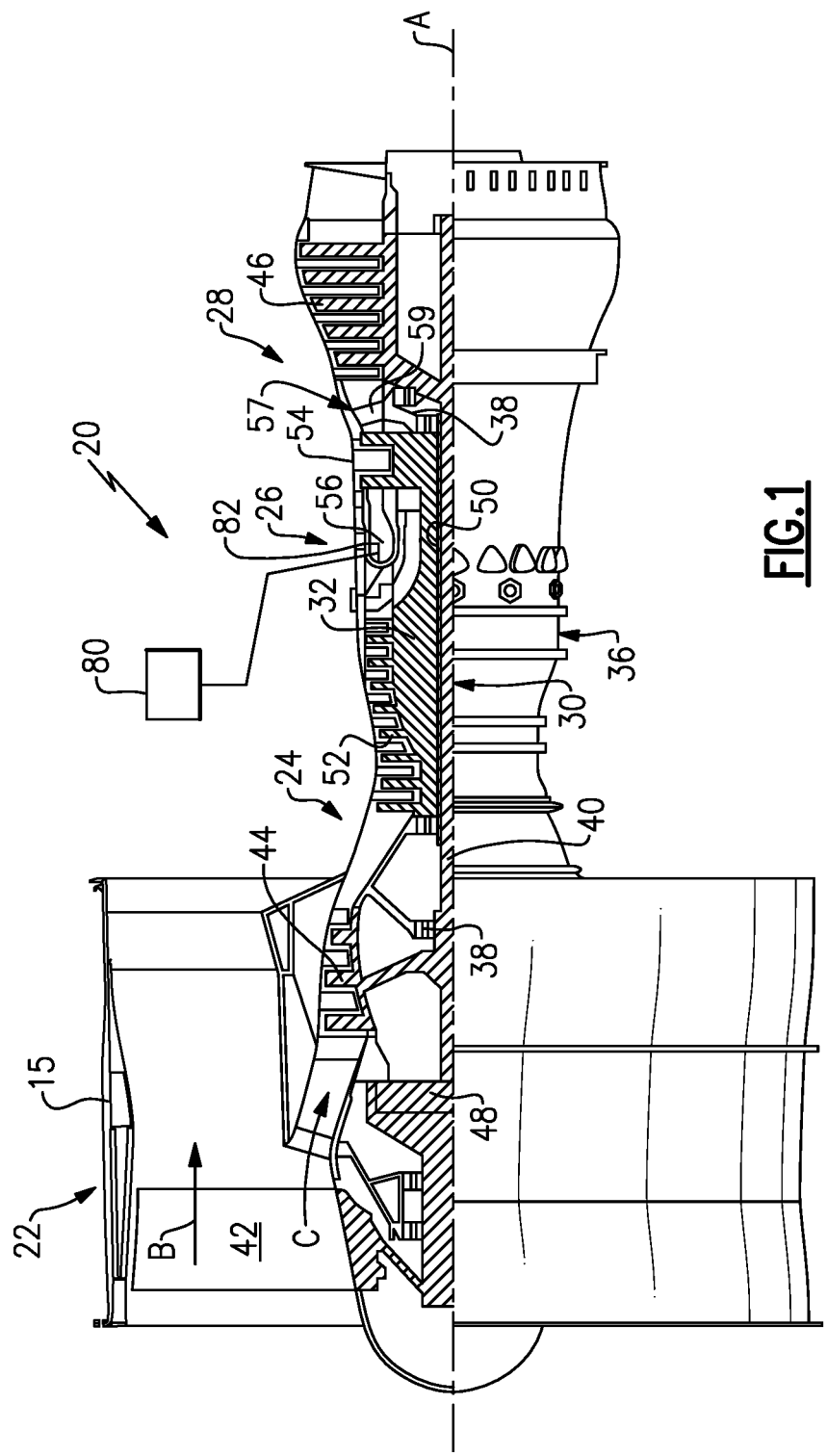
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{.5}$. The "Low corrected fan tip speed" as disclosed herein according to one non-limiting embodiment is less than about 1150 ft/second (350.5 meters/second).

Included within the combustor 56 are multiple fuel injection nozzles that inject fuel into the combustor 56 and allow for the combustion operations. Included within these is at least one start injector nozzle 82. The start injector nozzles 82 are similar in form to the other fuel injection nozzles within the combustor 56, but are only used during startup engine operations. Injection of fuel through the start injector nozzles 82 is controlled via a controller 80. In one example, the controller 80 is a full authority digital engine controller (FADEC). In alternative examples, the controller 80 can be any other general engine or aircraft controller, or a specialized fuel injection controller.

When the engine 20 is first initialized, fuel is provided through the start injector nozzles 82 in order to facilitate lighting the engine 20. Once the engine 20 has increased speeds to a self-sustaining speed, fuel from the main fuel injector nozzles is sufficient to maintain operations. In some examples the self-sustaining speed is 85% or more of the max engine speed. Once the engine 20 has reached the self-sustaining speed, the controller 80 causes the start injector nozzles 82 to cease providing fuel. If fuel remains stagnant in the start injector nozzles 82, the exposure to the heat of the combustor can cause coke deposits to form from the stagnant fuel within the start injector nozzles 82.

In order to prevent the coke deposits from forming, existing systems incorporate a purge system. The purge system serves a dual purpose of purging fuel and active nozzle cooling thereafter. The purge system forces compressor air through a one way check valve upstream of the start injector nozzles 82, thereby replacing fuel in the start injector nozzles 82 with air. Purge systems operating in this manner still leave residual fuel traces in the start injector nozzles 82. When the residual fuel traces are exposed to the heat, they form coke deposits which build up over time and still reduce efficiency of the start injector nozzle. The coke deposits in an air purge system take longer to accumulate than in engines with no coking mitigation systems, but will eventually accumulate to problematic levels.

Figure 2A:
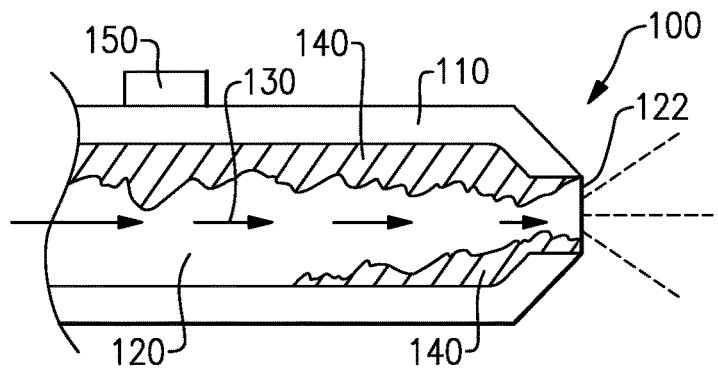
FIG. 2A illustrates a highly schematic cross section of an exemplary start injector nozzle along an axial cross section.
Figure 2B:
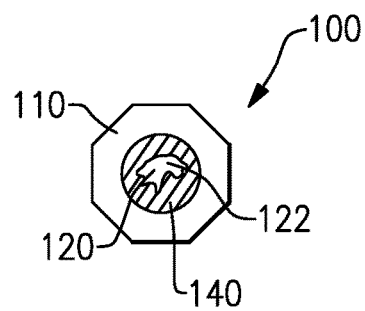
FIG. 2B illustrates a second highly schematic cross section of the exemplary start injector nozzle along a radial cross section.
Figure 3:
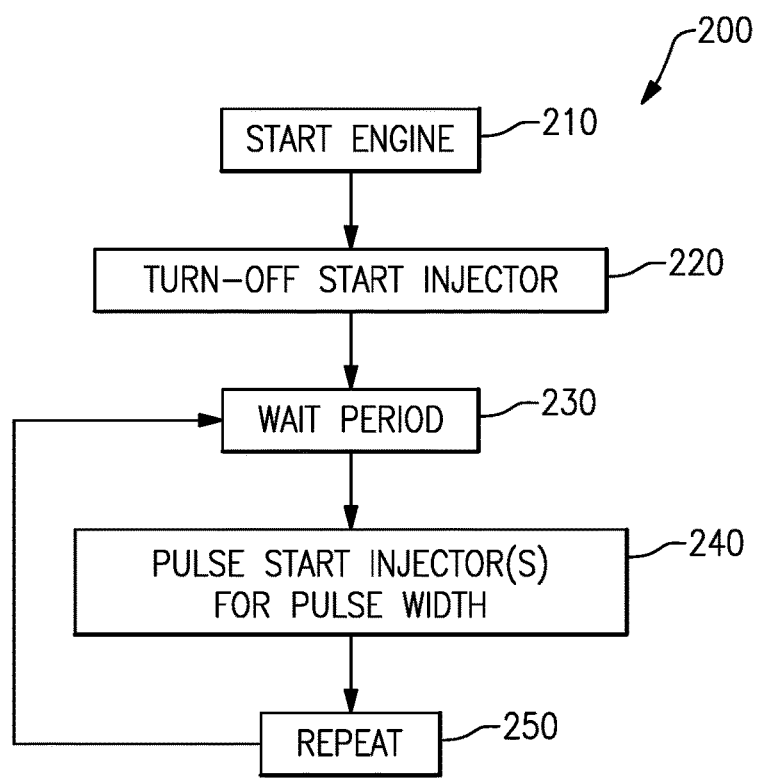
FIG. 3 illustrates a method of operating a start injector nozzle to minimize coking.

With continued reference to FIG. 1, FIGS. 2A and 2B schematically illustrate an exemplary coked fuel nozzle 100 via an axial (FIG. 2A) cross section and a radial (FIG. 2B) cross section. The fuel nozzle 100 includes a tubular body 110 defining an internal passage 120 that directs a fuel 130 from a fuel source to a nozzle outlet 122. When fuel within the fuel nozzle 100 is exposed to heat due to heat transfer from the elevated wall temperatures in excess of the coking temperature of the fuel type, coke deposits 140 form along the fuel nozzle walls and obstruct flow through the fuel nozzle 100. In extreme cases, the coke deposits 140 can fully obstruct the fuel nozzle 100, preventing operation of the fuel nozzle 100 entirely.

With reference again to FIG. 1, the exemplary engine 20 omits the previously described air purge within the fuel nozzle 100 and the fuel nozzle 100 is allowed to remain full of fuel. In order to prevent the coking illustrated in FIGS. 2A and 2B, the controller 80 includes instructions configured to pulse the fuel nozzle 100 periodically, thereby replacing the stagnant fuel within the fuel nozzle 100 with fresh fuel, actively cooling the walls of the fuel nozzle. The fresh fuel is cooler than the stagnant fuel, and will take longer to form coke deposits. By continuously replenishing the stagnant fuel with new fresh fuel maintaining low fuel nozzle wall temperatures, below the fuel coking temperature threshold, coke deposits can be prevented entirely.

Each pulse of the fuel nozzle 100 is defined by a period and a pulse width. The period refers to how frequently the pulse occurs (i.e. the time between pulses), and the pulse width refers to the duration of the pulse. The period and pulse width of the fuel nozzle 100 is defined within the controller 80 and is set at a level that will replace a sufficient quantity of fuel within the nozzle with new, cooler, fuel prior to the fuel within the fuel nozzle 100 reaching the coking temperature threshold for the specific fuel type being utilized.

In one example system the period (time between pulses) is preset in the controller 80 for any given fuel type and is based on the operating conditions (e.g. engine load, engine speed, and inlet temperatures etc.) and the fuel is pulsed by the controller 80 every time the period elapses. By way of example, the fuel nozzle 100 can be pulsed more frequently when the engine is at heavy load, and thus hotter, and can be pulsed less frequently when the engine is at low load, and thus cooler. In such an example, the controller 80 is preloaded with a table defining pulse periods for each load type and fuel type that is expected.

In another example, the period between pulses is determined based on a direct or derived temperature measurement of the nozzle wall of the fuel nozzle 100. In one example, a temperature sensor 150 can be disposed directly on the fuel nozzle 100 and measures the temperature of the nozzle wall. In another example, the temperature of a nozzle wall can be derived based on knowledge of the temperature of the fuel source, a temperature within the combustor 56, and a time that the fuel has been stagnant within the fuel nozzle 100. Alternatively, any other method to derive the temperature of the nozzle wall can be used to the same effect.

In either example, the controller 80 is configured to pulse the fuel before the temperature of the fuel exceeds a coking temperature threshold. In some systems the threshold temperature for a pulse can be set at, or near, the coking temperature threshold of the fuel. By way of example, if a fuel has a coking temperature of 475 degrees F. (246.1 degrees C.) for Jet A, the pulse threshold can be set at 375 degrees F. (190.6 degrees C.). In other examples, the pulsing temperature threshold can be set further away from the coke threshold in order to provide more margin of error. In some examples the pulse temperature threshold is set at least 70% of the coking temperature threshold.

The pulse width of each pulse is determined based on the wall temperatures of the fuel nozzle 100 and the rate at which fresh fuel is capable of cooling those walls maintaining a temperature below the pulse threshold setpoint selected for that specific fuel.

In another example, the pulse width can be set at a sufficient length of time that approximately 100% of the fuel in the nozzle is replaced with cooler fresh fuel. As used herein, approximately 100% of the stagnant fuel refers to all of the stagnant fuel with the exception of trace amounts. In another example the pulse width can be set at a time that at least 200% of the volume of stagnant fuel is supplanted, thereby further cooling the wall. The specific length of the pulse width can be determined based on empirical testing, flow rate measuring, or any other known technique and can vary and managed by the controller depending on altitude, load condition, outside air temperature and vehicle speed.

The mechanical operations of the fuel nozzle 100, and the particular control signals required to achieve them are conventional in the art, and can take any known form.

With continued reference to FIGS. 1, 2A and 2B, FIG. 3 schematically illustrates a process by which the controller 80 prevents coking within a start injector nozzle. Initially the controller 80 uses the start injector nozzle in engine startup during a "Start Engine" operation 210. Once the engine has reached self-sustaining speeds, the controller 80 turns off the start injector nozzle(s) in a turn-off start injector step 220. The controller 80 allows the fuel within the start injector nozzle 100 to remain stagnant for a period of time in a "Wait Period" step 230. As described above, the period can be either predefined by the controller 80 and dependent on the fuel type, or can be based on measured or derived temperatures of the fuel within the fuel nozzle 100.

Once the period has elapsed, the fuel nozzle 100 is pulsed for a pulse width in a "Pulse Start Injector(s) for Pulse Width" step 240. The pulsing includes spraying existing fuel from the fuel nozzle 100 into the combustor 56 and replacing the fuel with fresh fuel from the fuel source within the aircraft carrying the engine 20.

Once the fuel nozzle 100 has been sufficiently flushed and fresh fuel has replaced enough of the stagnant fuel within the fuel nozzle 100, the temperature within the fuel nozzle 100 is reduced away from the coking temperature threshold, and the process returns to the wait period step 230 via a "Repeat" operation 250.

While described above as being contained within an engine designed around the method described herein, it is further appreciated that existing engines including upgradable or programmable controllers can be updated to incorporate this feature by updating or replacing the start injector control logic of an existing FADEC and including the process described herein.

Furthermore for engines that continuously operate the start injectors even after the engine has achieved 100% speed, there may be opportunities to implement this pulse logic to the start nozzles, which would allow the end user to observe fuel savings without the risk of coking the nozzles.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for operating a fuel injector comprising:
defining a pulse width of a fresh fuel pulse in a controller and pulsing a fresh fuel through a start injector nozzle using the fresh fuel pulse and thereby preventing stagnant fuel in the start injector nozzle from exceeding a coking temperature threshold of the stagnant fuel by forcing the stagnant fuel out of the start injector nozzle by providing the fresh fuel to the start injector nozzle for the pulse width; and
wherein the pulse width is a predefined duration of time such that a volume of the fresh fuel pulsed through the start injector nozzle is at least 100% of a volume of the stagnant fuel.

2. The method of claim 1, wherein the pulse width is stored in a controller memory and is at least partially dependent on a fuel type.

3. The method of claim 1, further comprising allowing the fresh fuel in the start injector nozzle to be stagnant for a period of time and reiterating pulsing the fresh fuel through the start injector nozzle after the period of time has elapsed.

4. The method of claim 3, wherein the period of time is stored in a controller memory and is dependent on a fuel type and an engine operating condition.

5. The method of claim 4, wherein the engine operating condition is an engine load.

6. The method of claim 3, wherein the period of time is determined to have elapsed when a temperature of the stagnant fuel exceeds a pulse temperature threshold.

7. The method of claim 6, wherein the pulse temperature threshold is at most 70% of the coking temperature threshold of the stagnant fuel.

8. The method of claim 6, wherein a temperature of a nozzle wall is determined via direct measurement.

9. The method of claim 6, wherein a temperature of a nozzle wall is derived via one or more indirect measurements.

10. The method of claim 1, wherein the pulse width is the predefined duration of time such that the volume of the fresh fuel pulsed through the start injector nozzle is 100% of the volume of the stagnant fuel.

11. The method of claim 1, wherein the pulse width is the predefined duration of time such that the volume of the fresh fuel pulsed through the start injector nozzle is 200% of the volume of the stagnant fuel.

12. The method of claim 1, further comprising defining a pulse frequency of the fresh fuel pulse within the controller, wherein the pulse frequency is a time period in between the fresh fuel pulses.

13. A gas turbine engine comprising:
a compressor section;
a combustor fluidly connected to the compressor section via a primary flowpath;
a turbine section fluidly connected to the combustor via the primary flowpath;
a plurality of fuel injectors disposed within the combustor, the plurality of fuel injectors including at least one start fuel injector;
a controller including a memory and processor, the memory storing instructions configured to define a pulse width of a fresh fuel pulse,
and the memory storing instructions configured to cause the at least one start fuel injector to pulse a fresh fuel through a start injector nozzle using the fresh fuel pulse, thereby preventing stagnant fuel in the start injector nozzle from exceeding a coking temperature threshold of the stagnant fuel; and
wherein the pulse width of pulsing the fresh fuel through the start injector nozzle is a predefined duration of time such that a volume of the fresh fuel pulsed through the start injector nozzle is at least 100% of a volume of the stagnant fuel.

14. The gas turbine engine of claim 13, wherein the at least one start fuel injector includes at least one temperature sensor.

15. The gas turbine engine of claim 13, wherein the controller includes instructions configured to derive a temperature of the stagnant fuel within the at least one start injector based on engine operating conditions.

16. The gas turbine engine of claim 13, wherein the controller further includes instructions configured to reiterate pulsing the fresh fuel through the start injector nozzle according to a period of time dependent on a fuel type and an engine operating condition.

17. The gas turbine engine of claim 13, wherein the controller further includes instructions configured to reiterate pulsing the fresh fuel through the start injector nozzle in response to a temperature of the stagnant fuel in the start injector nozzle exceeding a predefined temperature threshold.

18. The gas turbine engine of claim 17, wherein the predefined temperature threshold is at most 70 percent of the coking temperature threshold of the stagnant fuel.

19. A method for improving a gas turbine engine comprising:
updating an engine controller configured to control a start injector nozzle in a combustor by providing the controller a predefined fresh fuel pulse width and with instructions configured to cause the controller to cause at least one start fuel injector to pulse a fresh fuel through the start injector nozzle for the predefined fresh fuel pulse width, thereby preventing stagnant fuel in the start injector nozzle from exceed a coking temperature threshold, wherein the predefined fresh fuel pulse width of pulsing the fresh fuel through the start injector nozzle is a duration of time such that a volume of the fresh fuel pulsed through the start injector nozzle is at least 100% of a volume of the stagnant fuel.

* * * * *